May 7, 1968  F. E. PORAMBO  3,381,658
APPARATUS FOR SUGAR COATING DOUGHNUTS
Filed Jan. 4, 1966  3 Sheets-Sheet 1

INVENTOR.
FRANCIS E. PORAMBO
BY Howard J. Jeandron
AGENT

May 7, 1968  F. E. PORAMBO  3,381,658
APPARATUS FOR SUGAR COATING DOUGHNUTS
Filed Jan. 4, 1966  3 Sheets-Sheet 2

INVENTOR.
FRANCIS E. PORAMBO
BY
AGENT

May 7, 1968     F. E. PORAMBO     3,381,658
APPARATUS FOR SUGAR COATING DOUGHNUTS
Filed Jan. 4, 1966     3 Sheets-Sheet 3

INVENTOR.
FRANCIS E. PORAMBO
BY
AGENT

United States Patent Office 3,381,658
Patented May 7, 1968

3,381,658
APPARATUS FOR SUGAR COATING DOUGHNUTS
Francis E. Porambo, Elizabeth, N.J., assignors to Franchetts Crullers, Inc., Elizabeth, N.J., a corporation of New Jersey
Filed Jan. 4, 1966, Ser. No. 518,651
2 Claims. (Cl. 118—19)

ABSTRACT OF THE DISCLOSURE

An apparatus for sugar coating doughnuts which comprises a first hopper to supply sugar positioned over the device, a rotating drum into which the doughnuts tumble and are coated with sugar, an open cage formed of bars that is rotatable and extends along the longitudinal axis from the drum to tumble and flip the doughnuts to remove excess granular sugar and a second hopper and screen to receive the surplus granular material and separate and throw off particles that are larger than the granular sugar, and a conveyor to carry the sieved sugar back to the charging end of said rotatable drum.

---

Figure 1:
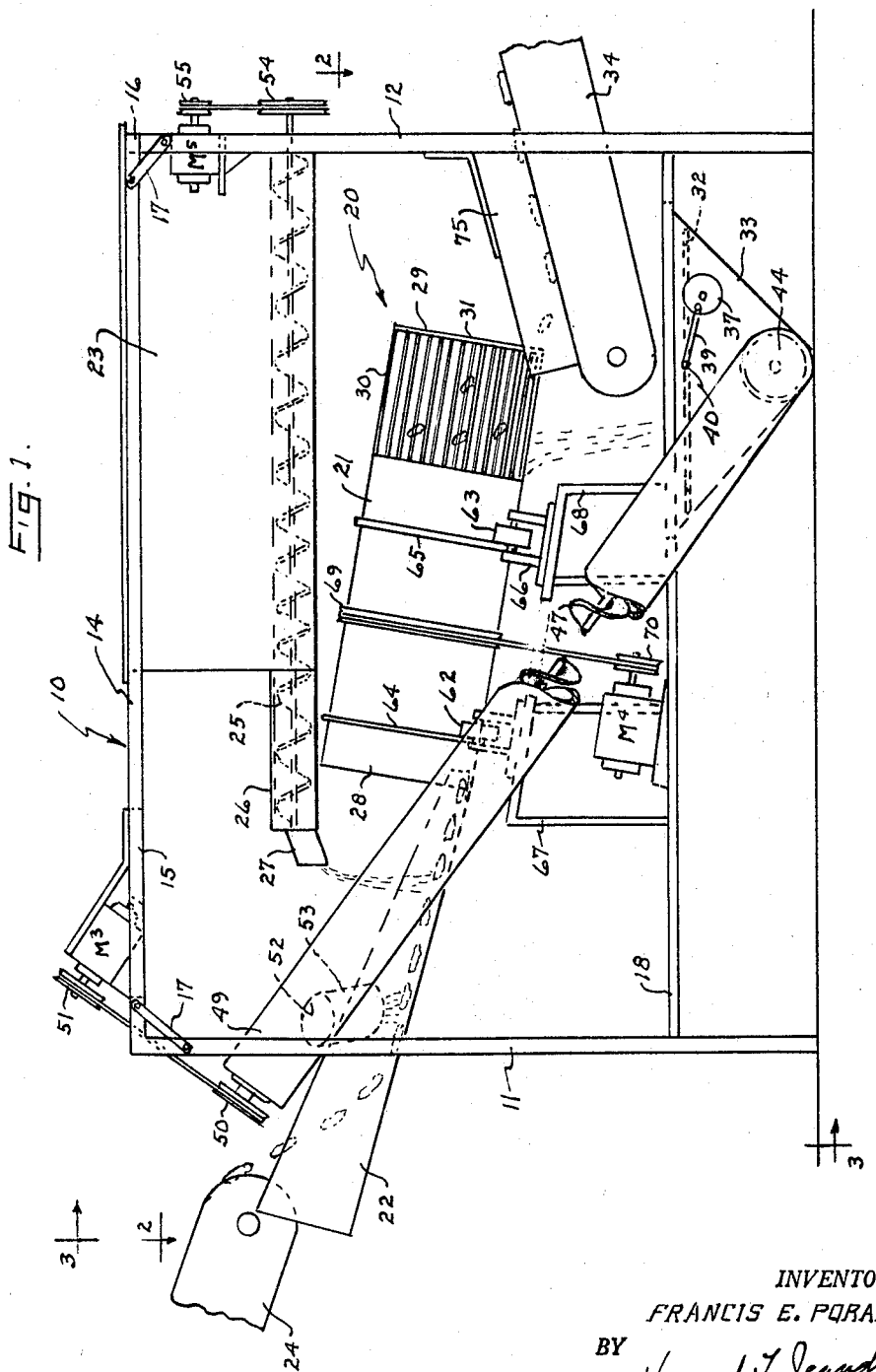

The present invention relates to an apparatus for conveying doughnuts into a position under a sugar spray or discharge and means to tumble and roll the doughnut to provide a complete sugaring and means to discharge the sugar coated doughnut.

Although the invention is primarily concerned with the sugar coating of doughnuts, the novel features and advantages of this device may be applied to the dusting or coating of similar bakery goods and in the general treatment of products of this nature.

The apparatus shown herein may serve one conveyor or a plurality of conveyors delivering doughnuts to this device. However there shall not be a limitation as to size or to the quantity of doughnuts that shall be treated. This invention shall illustrate a single device to continually carry the doughnut forward during the process of being sugar coated. The device is designed to sugar coat the doughnuts as they are tumbled during their progression through the device.

The prior art is best illustrated in Patent No. 2,878,776 in which doughnuts are sugar coated while passing through a device or cabinet in which there are a plurality of conveyors. The conveyors in this device are spaced one above the other and the doughnut is guided from the first conveyor to drop upon the second conveyor reversing its travel in an opposite direction and again guided as it falls to the third conveyor reversing its direction of travel and finally tumbled onto a fourth conveyor to carry it out of the sugar coating cabinet. This may seem quite similar but due to the difficulty of spraying or sifting a powdered material such as sugar downward upon the doughnuts, any apparatus interferring with the spraying tends to spread the spray to either side of the cabinet. It is necessary in a sugar coating device to provide a clear open direct spray of the powdered sugar directly to the doughnut without interference from any apparatus.

It is an object of this invention to provide a sugar coating apparatus for doughnuts in which there is a continuous forward movement of the doughnut from the time it enters the device until it leaves the device while it is being sprayed, tumbled and rolled during its travel through the device.

A further object of this invention is to provide a sugar coating apparatus for doughnuts in which there is an open top inclined chute to receive a continuous flow of freshly cooked doughnuts and a hopper above said chute to contain granular coating material that will be sprayed by gravity upon the doughnuts passing through said chute to coat said doughnuts.

A still further object of this invention is to provide a sugar coating apparatus for doughnuts in which there is an open top inclined chute to receive a continuous flow of freshly cooked doughnuts and a hopper above said chute to contain granular coating material that will be sprayed by gravity upon the doughnuts passing through said chute to coat said doughnuts and in which there is an inclined rotating drum into which the coated doughnuts are discharged to tumble said doughnuts and spread the granular coating that does not at first adhere to said doughnuts, to respray all surplus granular material upon the doughnuts passing through said drum.

A still further object of this invention is to provide a sugar coating device for doughnuts in which there is a sugar spray upon the doughnuts and a continuously rotating drum through which the doughnuts pass to be tumbled and a continuously operated shaker screen for surplus sugar to be sieved and returned from the area under the screen to the sugar spraying area.

Although the term "sugar" has been used and shall be used with relation to the product doughnut in this example, it shall be understood that the sugar shall include any flowable material primarily solids of small particle size similar to sugar, salt, cinnamon, etc. but also including any material that will flow or slide under the influence of gravity such as crumb topping, etc. This may include semi-solids and liquids. It is also to be understood that the conveyors onto which the doughnuts are discharged may be constructed to carry a wide range of products of materials depending upon the particular treatment required for the product whether it be sugar or salt coating, flour or cinnamon coating, etc.

Although the product has been specified as doughnut, it shall include any sugared or coated cake, candy or nuts.

Figure 2:
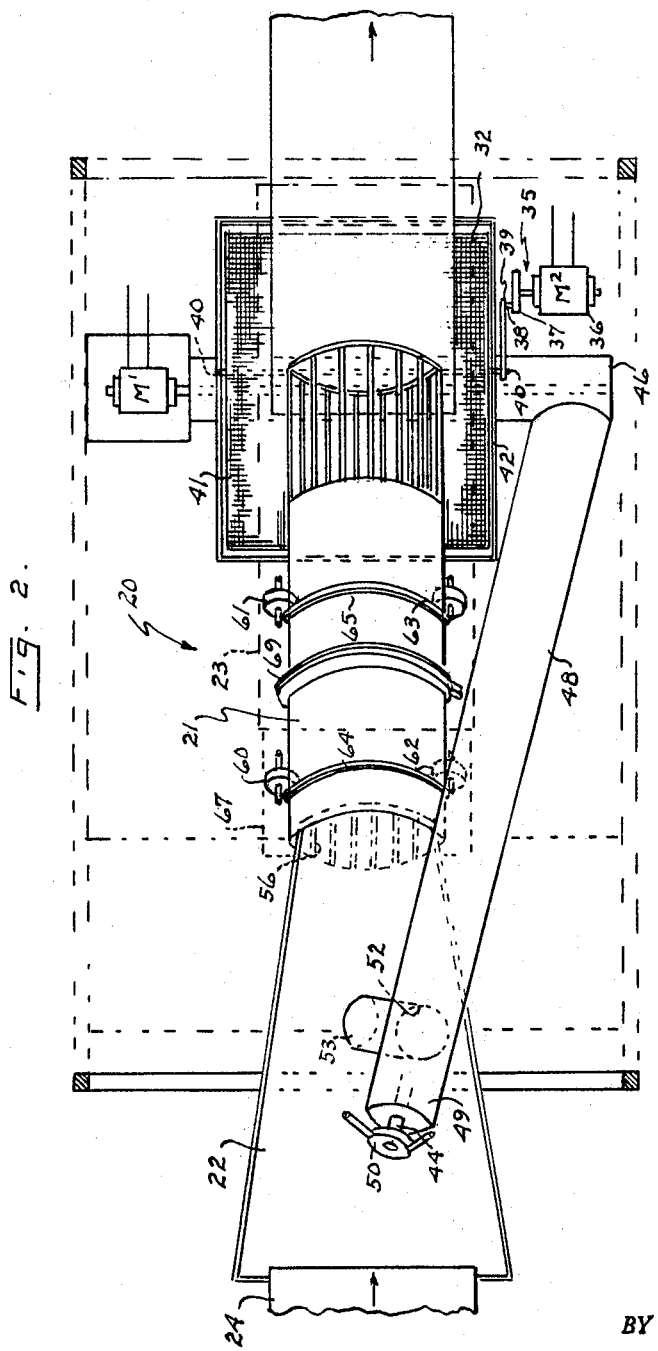
Figure 3:
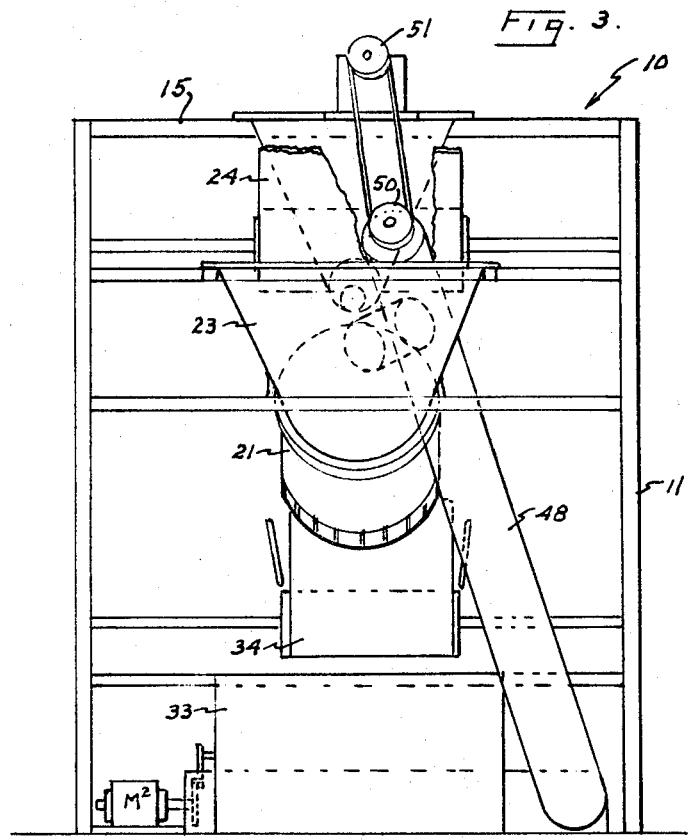

Other objects of this invention may be apparent by reference to the accompanying detailed description and the drawings in which FIG. 1 is a schematic side elevational view in partial cross section, FIG. 2 is a plan view taken on line 2—2 of FIG. 1, and FIG. 3 is an end view taken on line 3—3 of FIG. 1.

Referring to the drawings there is illustrated a sugar coating device for doughnuts in which there is a supporting structure 10 comprised of two front uprights 11 and two rear uprights 12. The uprights 11 and 12 are joined at their upper end by a pair of beams 14 while beams 14 are joined by cross beams 15 and 16. Braces 17 are provided between beams 14 and uprights 11 and 12 to give rigidity to the structure. A supporting raised platform 18 is provided that is supported between the pairs of uprights 11 and 12. Within this structure the sugar coating apparatus 20 is mounted. The apparatus 20 comprises a barrel shaped tumbler 21, a chute 22 and a sugar storage tank 23. The components are set up so that the doughnuts to be coated with sugar are fed from a conveyor 24 to be dropped into chute 22. Chute 22 is inclined so that the doughnuts are slid down the chute by gravity falling into the tumbler 21. However since the doughnuts are to be coated with sugar or a granular substance, the sugar stored in tank 23 is fed by means of a worm drive conveyor 25 to feed through tube 26 and pour through spout 27 upon the doughnuts in the open chute 22. The conveyor 25 is driven by means of a pulley 54 attached to one end of conveyor 25, pulley 54 being connected by a belt to a second pulley 55, pulley 55 being attached or affixed to the drive shaft of motor M5. Thus the doughnuts and sugar are passed into the tumbler 21 and will be thoroughly tumbled and thus the doughnuts thoroughly coated with sugar as they proceed through a tumbler 21, tumbler 21 being inclined to assist the movement of the doughnuts from the charging end 28 to the discharge end 29. The discharge end 29 is constructed in the form of an open cagelike structure. As illustrated there is a plurality of bars 30 extending from the tumbler end to a ring 31 to form the cagelike structure with an open end within ring 31. As the doughnuts fall into the cagelike portion 29, the excess sugar or granular material will drop through the open cagelike structure falling into a receiving hopper 33 while the doughnuts will fall from within the discharge end upon a conveyor 34 which carries the doughnuts upward and away from the sugar coating device. Any sugar or granular material falling upon conveyor 34 slide downward from conveyor 34 falling into hopper 33. In order that hopper 33 will receive only the granular material or sugar, there is provided a screen 32 across the top of hopper 33 and the screen is of such a mesh that it will allow only the granular sugar to drop through. All foreign particles or pieces of doughnut would be retained on top of the screen. To prevent any build up of the granular material upon the screen, there is provided a shaker mechanism 35 to agitate the screen to assist in sieving the granular material and prevent the build up in any portion of the screen. Shaker mechanism 35 comprises a motor 36 which drives a cam 37, cam 37 having an eccentric pin 38 which drives a link 39, link 39 being pivotally attached to a central rod 40 affixed to the screen 32. Screen 32 is positioned in a pair of tracks 41 and 42 at either side of hopper 33 so that screen 32 will move in a reciprocating motion to provide the necessary vibration or agitation to sieve the granular material falling thereon. The hopper 33 is provided in a V shape so that the sugar or granular material will slide towards the bottom of the hopper. A worm drive conveyor 44 is provided and positioned at the lowest point in hopper 33. The worm drive conveyor 44 is connected at one end to a motor M1 to drive the conveyor so that it will carry the accumulated sugar or granular material through the hopper 33 outward through a tubular end 46 where it is in turn picked up by a second worm drive 47 extending through an upright tubular element 48, the sugar or granular material being forced upward through tube 48 to its upper end 49, the worm drive 47 being driven by a pulley 50, pulley 50 being connected by a belt to a pulley 51 that is affixed to motor M3. Thus motor M3, when energized, drives worm 47 to carry the sugar or granular material upward. As the sugar or granular material reaches the upper end 49 of tube 48, it will spill through an aperture 52 in tube 48 spilling through an extended spout 53 to fall upon the doughnuts in the open chute 22. Thus the sugar or granular material that has not adhered to the doughnuts in the first passage through tumbler 21 is recirculated with the fresh supply of sugar being discharged from spout 27 to provide a thorough coating of sugar upon the doughnuts that are passing through tumbler 21. The tumbler 21 is a hollow cylinder in form provided with a plurality of parallel ribs 56 on its interior surface to assist in lifting the doughnuts and sugar as the tumbler 21 rotates and thus tossing the doughnuts and sugar by gravity to thus turn the doughnuts in every possible position to thoroughly coat them with sugar or granular material as they pass through the tumbler. The cylindrical tumbler 21 on its exterior is supported by four rollers 60, 61, 62 and 63 which bear against the exterior surface of the tumbler. Since the tumbler is positioned in an inclined relation, there are provided a pair of collars 64 and 65 so that collar 64 abuts with rollers 60 and 62 while collar 65 abuts with rollers 61 and 63 thus allowing a free rolling position on the rollers but preventing any slippage of tumbler 21 from its operating position. The rollers 60–62 are supported by means of a frame 67 while rollers 61–63 are supported by a frame 68, frames 67 and 68 are in turn supported on platform 18. To drive tumbler 21 in a rotary motion, there is provided a V-shaped groove 69 about the periphery of tumbler 21 at about the mid position of the cylindrical body. A pulley 70 affixed to the drive shafts of motor M4 is mounted on platform 18 so that pulley 70 is in alignment with the V-shaped groove 69 so that by means of a belt, motor M4 will drive tumbler 21 in a rotary motion on the rollers as described.

In the operation of the device as described all of the motors M1 through M5 may be connected in series to provide simultaneous operation or all of the motors may be separately operated as desired. For example, motor M1 (FIG. 2) is not necessary until the device has been operating for a short cycle to build up a spillage of sugar into hopper 33. Therefore it need not be started with the initial operation of the device. Likewise, after the device has run for a considerable time, there may be a build up of sugar being recirculated, thus the supply of a fresh sugar from tank 23 may not be needed and motor M5 (FIG. 1) may be stopped before the device is to be stopped. Thus separate controls may provide a more efficient operation of the device. Following the normal operation of the device with doughnuts being supplied from a conveyor 24, the tumbler 21 is started by means of motor M4 and sugar is supplied by starting motor M5 thus the doughnuts falling into hopper 22 will receive sugar falling upon them in the hopper and the doughnuts and sugar will spill into tumbler 21 where the doughnuts are tumbled to be thoroughly coated with the sugar that will be sprayed upon the doughnuts as they pass through tumbler 21. The doughnuts falling through the open cagelike end 29 will drop all surplus sugar which will fall upon screen 32 thus motor M2 must be energized to provide the agitation to the shaker screen 32. The doughnuts falling out of the cagelike end 29 will drop upon conveyor 34 to be carried away from the device. In order that the doughnuts are not spilled either side of conveyor 34, a pair of barrier guards 75 are positioned either side of the conveyor to retain the doughnuts being dropped upon the conveyor. The sugar or granular material being sieved through sieve 32 will pile up in hopper 33 and by starting motor M1, the sugar or granular material will be carried through the tubular end 46 to be in turn picked up by the conveyor 47 to be carried up tube 48 and spill through aperture 52 to spill out spout 53 upon the doughnuts passing through chute 22. The feed of sugar from tank 23 out spout 27 must be regulated with the speed of the doughnuts passing into chute 22 and through tumbler 21, that is, if too much sugar is supplied, it will tend to pile up and spill, if too little sugar is supplied, the doughnuts will not be properly coated. Therefore the drive from motor M5 must be predetermined based on the speed of supply of doughnuts. Any change in the production of doughnuts requires a shutdown of motor M5 or a change of ratio of pulleys to provide a proper supply of sugar for the supply of doughnuts to prevent a build up of sugar and to insure a sufficient supply of sugar. The tumbler 21 is designed of a sufficient size with relation to the product such as a doughnut so that as the product passes through tumbler 21, it will be lifted and dropped a number of times before it leaves tumbler 21. Thus the speed of rotation of tumbler 21 must be slow but of sufficient speed to prevent any build up of doughnuts entering tumbler 21 so that there is a normal flow of doughnuts from chute 22 being lifted by tumbler 21 away from the mouth of chute 22 and providing a thorough tossing of the doughnut to permit a sugar coating of its complete surface as it passes through tumbler 21.

Although the device has been described with relation to a bakery product, it shall not be limited to bakery products but may be used for the dusting or coating of a variety of products of this nature especially where the product is small and requires a thorough dusting or coating of a powder or granular material. Although the coating or dusting has been referred to as sugar which is used with a bakery product, the coating shall be understood to include other types such as cinnamon, crumb topping, meal, bran, flour, seed grain and shredded products used for coating as edible products. However in the coating of non-edible products, the coating shall include powder, dust, sand, sawdust, grit and similar small particles. Although we have described tumbler 21 as a cylindrical container with a plurality of internal distributing ribs 56, it shall be understood that the tumbler 21 need only be cylindrical on its exterior for rotation while the interior may take a different form to provide a plurality of surfaces or shelves for picking up and tumbling the product passing therethrough and although in this particular instance the tumbler 21 is preferably formed of a stainless steel to handle an edible product, the tumbler may be formed of other materials or may be lined with another material so that the product and interior surface of tumbler 21 are compatible without departing from the spirit of this invention and this invention shall be limited only by the appended claims.

What is claimed is:

1. An apparatus for sugar coating doughnuts which includes an inclined chute to receive doughnuts from a doughnut forming and cooking device, a first hopper for granular material positioned over said chute to discharge said granular material upon said doughnuts in said chute, a means in said hopper to control the discharge of granular material from said hopper, a solid rotating drum having an entrance end into which the coated doughnuts from said chute are discharged to be first tumbled and coated and a discharge end, an open cage formed of spaced bars parallel to the axis of the drum and forming the discharge end of said drum to further obstruct the travel of said doughnuts and cause them to tumble and flip to remove excess granular material as they leave said drum, a screen to receive the excess granular material from said drum and further sieve said granular material, a second hopper under said screen to receive all surplus granular material, a single worm conveyor to carry said granular material from said second hopper at the discharge end of said hopper back to said inclined chute at the charging end to be recirculated.

2. An apparatus for coating articles which includes an inclined chute to receive the articles from a forming device, a first hopper for coating material positioned over said chute, a means in said hopper to control the discharge of coating material from said hopper, a solid rotating drum having an entrance end into which the coated articles from said chute are discharged to be tumbled and a discharge end, an open cage formed of spaced bars parallel to the axis of the drum and forming the discharge end of said drum to further obstruct the travel of said articles and cause them to be tumbled as they leave said drum and to also sieve the excess coating material, a screen to receive the excess coating material from said drum and further sieve said coating material as it drops, said screen agitated by a vibrating means to throw off particles that are larger than the coating material, a second collecting hopper positioned below said screen to receive all surplus coating material, a single worm conveyor to carry said sieved coating material from the discharge end of said drum back to said chute at the charging end of said drum.

References Cited

UNITED STATES PATENTS

| 1,012,877 | 12/1911 | Mahan | 118—19 |
| 1,739,642 | 12/1939 | Light | 118—19 |
| 2,970,563 | 2/1961 | Hunter | 118—19 |
| 3,097,967 | 7/1963 | Fries et al. | 118—19 |

CHARLES A. WILLMUTH, *Primary Examiner.*

J. P. McINTOSH, *Assistant Examiner.*